(12) United States Patent
Ross

(10) Patent No.: US 6,286,061 B1
(45) Date of Patent: Sep. 4, 2001

(54) SYSTEM FOR APPLYING A TAG TO A FRAME BASED ON CERTAIN CHARACTERISTICS OF THE FRAME AND TRANSFERRING THE FRAME AS A FUNCTION OF THE TAG

(75) Inventor: Kevin Ross, Sunnyvale, CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/090,005

(22) Filed: Jun. 2, 1998

(51) Int. Cl.[7] .................................................. G06F 13/14
(52) U.S. Cl. ............................ 710/33; 709/206; 709/238
(58) Field of Search ............................. 710/33; 709/206, 709/238

(56) References Cited

U.S. PATENT DOCUMENTS

| | | | |
|---|---|---|---|
| 5,249,166 | * 9/1993 | Hamilton et al. | 369/32 |
| 5,347,642 | 9/1994 | Barratt | 395/425 |
| 5,452,464 | * 9/1995 | Nomura et al. | 712/201 |
| 5,721,866 | 2/1998 | Ballard | 711/138 |
| 5,937,161 | * 8/1999 | Mulligan et al. | 340/825.44 |
| 5,966,182 | * 10/1999 | Yonemitsu et al. | 348/423 |
| 6,028,979 | * 2/2000 | Hirayama et al. | 386/95 |

FOREIGN PATENT DOCUMENTS

WO8900313   1/1989 (WO) ............................... G06F/3/06

* cited by examiner

Primary Examiner—Thomas Lee
Assistant Examiner—Abdelmonien Elamin
(74) Attorney, Agent, or Firm—Steven R. Biren

(57) ABSTRACT

Methods and arrangements are provided to significantly reduce the processing burden in a data storage device and streamline the transfer of frames of data from the storage device to an external device, by taking into account certain known or otherwise determinable characteristics about the data recorded on the storage medium and selectively applying tag data to each frame of data. The tag data is then used to determine the disposition of each frame of data, and what actions if any are required to process the frame of data within the storage device. Since this "tagging", which can be logical or physical, can occur at an early stage in the circuitry of the storage device, the amount of subsequent processing is significantly reduced. Consequently, the latency associated with the storage device is also reduced. The various embodiments of the present invention can be used for a variety of data storage devices including, but not limited to, optical disc drives, magnetic drives and tapes, and similar data storage devices.

23 Claims, 7 Drawing Sheets

SYSTEM FOR APPLYING A TAG TO A FRAME BASED ON CERTAIN CHARACTERISTICS OF THE FRAME AND TRANSFERRING THE FRAME AS A FUNCTION OF THE TAG

BACKGROUND OF THE INVENTION

1. Technical Field

The present invention relates generally to data storage devices, and more specifically to methods and arrangements that can be employed to significantly reduce the processing requirements associated with the transfer of data from the storage device to an external device.

2. Background Art

An optical disc, such as, for example, a compact disc (CD) or digital versatile disc (DVD), is a nonmagnetic data storage medium on which relatively large amounts of digital information is stored by using a laser beam to burn microscopic indentations into a surface of the medium. The stored data is read using a lower-power laser to sense the presence or absence of the indentations.

There are many different types of optical disc systems (i.e., optical discs formats and devices) available today. One of the most common optical disc systems used in contemporary personal computers (PCs) is the compact disc read-only memory (CD-ROM). CD-ROM provides a read only optical storage medium onto which data is stored only once and then read many times using a CD-ROM drive. A CD-ROM disc can contain a mixed stream of digital image, audio, video, and/or text data Additional capacity is provided by a digital versatile disc read-only-memory (DVD-ROM). In the future, DVD-ROM will also be faster. Other advanced optical disc systems allow users to also write data to the optical disc. By way of example, a compact disc recordable (CD-R) system allows the user to write-once to each section of the optical disc, while a compact disc rewritable (CD-RW) allows the user to write to each section of the optical disc many times. Other notable optical disc systems include a compact disc magneto optical (CD-MO) disc, which is also rewritable.

Reading data from these exemplary optical disc systems typically begins with the PC's processor or host processor requesting that a block of data be scanned from the optical disc and transferred over a peripheral bus to the host processor or a primary memory. A block of data typically includes a plurality of smaller blocks or frames of data. These frames of data are typically pre-processed and logically gathered into groups within the optical disc drive, and then forwarded to the host processor over the peripheral bus. By way of example, an exemplary 16X CD-ROM drive for use with a PC typically includes a digital signal processing arrangement that pre-processes the retrieved data, and a buffer management arrangement that stores frames of data, which are typically between about 2 to about 3 kilobytes long, in a 128-kilobyte dynamic random access memory (DRAM) prior to transferring a group of frames to the host processor in a single burst.

One of the problems facing optical disc drive designers is that there can be different types of frames of data, depending upon the type/format of the optical disc, and, in certain situations, not all of these frames need to be transferred to the host processor.

For example, CD-ROM discs typically include data frames associated with certain "lead-in" and "lead-out" areas. These "lead area frames" contain a table of contents (TOC) descriptor that is used within the optical disc drive to properly locate and read the tracks recorded on the optical disc and to stay within permitted boundaries on the disc. In a further example, CD-R, CD-RW and other like recordable optical discs, typically employ a plurality of "link area frames", which are recorded between subsequently written blocks of data. These link area frames are also used within the optical disc drive to properly locate and read the blocks of data recorded on the track.

Consequently, it is preferred that the optical disc drive include the capability to determine which frames, within a block of data, are to be transferred to the host processor and which frames can be skipped or otherwise ignored and not transferred to the host processor. The task of determining which frames should be transferred to the host processor is typically conducted within a buffer manager arrangement, which can be configured to further process or otherwise examine each of the frames of data, for example, using a firmware-based processor that is responsive to a real-time firmware program. This frame-by-frame examination process tends to be burdensome on the buffer management arrangement, and at times other processing resources. Additionally, new generations of optical disc drives can introduce changes to the existing optical disc formats, or increase the speed at which an optical disc is read. As such, the processing capability of a conventional firmware-based processor may not be able to support the necessary processing demands and time constraints required in the future.

With this in mind, and considering that it is usually desirable for an optical disc drive to be compatible with the different optical disc formats/types, there is a need for methods and arrangements that effectively reduce the processing burden in an optical disc drive, and streamlines the transfer of frames from the optical disc drive to the host processor.

SUMMARY OF THE INVENTION

The methods and arrangements in accordance with the present invention significantly reduce the processing burden in a data storage device by streamlining the transfer of frames of data from the storage device to an external device by taking into account certain known and/or determinable characteristics about the data recorded on the storage medium, and selectively applying tag data to each frame of data. The tag data is then used to determine the disposition of each frame of data, for example, what actions, if any, are required to process the frame of data within the storage device. This "tagging" scheme, which can be significantly embodied in digital logic, tends to reduce the processing overhead for a significant portion of the frames of data. Therefore, the latency associated with the storage device is reduced, as well.

In accordance with certain aspects of the present invention, the various embodiments of the present invention can be used for a variety of data storage devices including optical disc drives, magnetic drives/tapes, and similar data storage devices.

With this in mind, the above stated needs and others are met by a decoder for use in transferring data from a data storage medium to an external device, in accordance with certain embodiments of the present invention. The data storage medium typically has at least one data track recorded on it. Within each of the data tracks, there is a plurality of smaller blocks or frames of data. The decoder includes an input arrangement, a frame managing arrangement and an output arrangement. The input arrangement is configured to receive at least one frame of data. The input arrangement is capable of determining certain characteristics about the frame of data and applying a tag data to the frame of data, based on at least one of these characteristics. Having "tagged" the frame of data, the input arrangement provides the tagged frame of data to the frame managing arrangement. The frame managing arrangement receives the tagged frame of data, stores the tagged frame of data, and subsequently provides the tagged frame of data to the output arrangement. The output arrangement receives the tagged frame of data and provides the tagged frame of data to an external device based on the tag data associated with the tagged frame of data.

In accordance with certain other embodiments of the present invention, the tag data is one of four types. The first type is a "send" tag, which essentially means that the associated tagged frame of data can be transferred to the external device, such as, for example, a host processor. The next type of tag data is a "skip" tag. When a frame of data is associated with a skip tag, then the tagged frame of data is essentially skipped over and is not transferred to the external device. If a "pause" tag, the third type of tag data, is associated with a frame of data, then the tagged frame of data requires further processing to determine if the tag data should be changed to a send tag, a skip tag, or a "stop" tag. The "stop" tag is the fourth type of tag data. When a tagged frame of data is associated with a stop tag then there is an error condition that will require additional processing.

By way of further example, in accordance with still further embodiments of the present invention, a send tag is applied to a frame of data when the characteristic identifies that the frame of data is either 1) a main area frame from a once-written track, 2) a main area frame from a fixed-length packet-written track, 3) a main area frame from a variable-length packet-written track, or 4) a valid link area frame from a variable-length packet-written track. Similarly, a skip tag is applied to a frame of data when the characteristic identifies that the frame of data is a link area frame from a fixed-length packet-written track, and a pause tag is applied to a frame of data when the characteristic identifies that the frame of data is a link area frame from a variable-length packet-written track. Stop tags are applied to frames of data when the characteristic identifies that the frame of data is not a valid frame of data. For example, if the frame of data is within an illegal address range, then a stop tag is applied. Further, if the frame of data can be read or has sync problems or data errors, but does not match the above characteristics, then a pause tag is applied to the frame of data.

The above stated needs and others are further met by a storage device for use in a computer system, in accordance with certain embodiments of the present invention. The storage device includes a servo assembly, a storage medium, a read assembly, a data engine, an input arrangement, a frame managing arrangement, and an output arrangement. The storage medium, such as, for example, an optical disc, magnetic disk, or combination thereof, is mounted on the servo assembly and the read assembly is used to read at least a portion of a track of data from the storage medium and output a read signal. The data engine receives the read signal and outputs at least one frame of data based on at least a portion of the read signal. The frame of data is then supplied to the input arrangement, which determines certain characteristics about the frame of data, applies tag data to the frame of data, and outputs a tagged frame of data to the frame managing arrangement, where it is stored and subsequently output to the output arrangement. The output arrangement then provides the tagged frame of data to an external device, based on the tag data within the tagged frame of data.

In accordance with yet another embodiment of the present invention, a method is provided for use in transferring data from a data storage medium to an external device. The method includes the steps of reading at least one frame of data from a data storage medium, determining certain characteristics about the frame of data, applying a tag data to the frame of data based on at least one characteristic about the frame of data, and providing the tagged frame of data to an external device, based on the tag data within the tagged frame of data. In accordance with certain embodiments of the present invention, the step of applying the tag data to the frame of data further comprises selecting either a send tag, a skip tag, a pause tag, or a stop tag depending upon the characteristic of the frame of data. The tagging of a frame of data can be logical and/or physical. By way of example, in accordance with certain embodiments of the present invention, the step of applying the tag data to the frame of data includes physically modifying data (e.g., adding a specific sequence of binary bits/bytes of data) within a tag area of the buffered frame of data to create the tag data.

Additional aspects, advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

Figure 1:
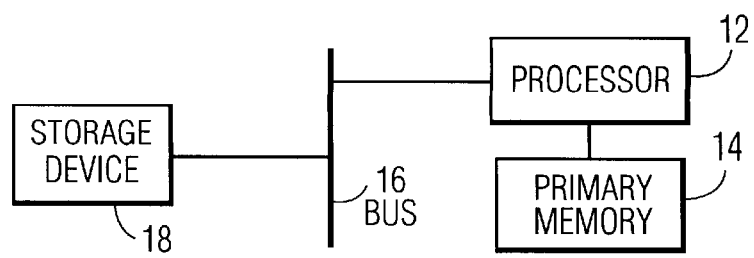
FIG. 1 is a block diagram depicting a conventional computer system having a storage device that is arranged to selectively transfer a block of data containing a plurality of data frames to a host processor over a bus or a similar network-based connection.

FIG. 1 is a block diagram depicting a portion of a conventional computer system 10, such as a PC, having a host processor 12, primary memory 14, bus 16, and a storage device 18. Host processor 12 is typically configured to read data from, and/or write data to, both primary memory 14 and storage device 18. Data that is read from storage device 18 is typically recorded into primary memory 14 before being processed by processor 12. Similarly, in certain configurations, data is read from primary memory 14 by host processor 12 and provided, over bus 16, to storage device 18, where it is written to a storage medium. Bus 16 is typically a peripheral bus, such as, for example, a Small Computer System Interface (SCSI), Advanced Technology Attachment Packet Interface (ATAPI), IEEE 1394 serial bus, or similar formatted bus.

For purposes of simplicity, the remainder of this text focuses on a read operation, in which the host processor 12 has requested that a block of data be read from storage device 18 and provided to host processor 12 and/or primary memory 14, via bus 16.

Figure 2:
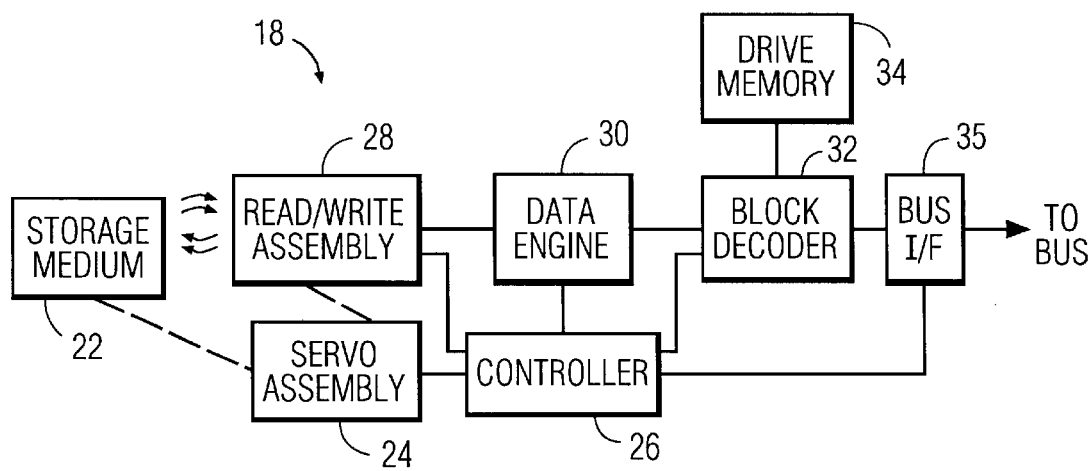
FIG. 2 is a block diagram depicting a storage medium on which at least one block of data is recorded, and a storage device, as in FIG. 1, that is arranged to read the block of data from the storage medium; the exemplary storage device having a read/write assembly, a servo assembly, a controller, a data engine, a block decoder, a drive memory and a bus interface.

FIG. 2 is a block diagram depicting the major subsystems in an exemplary storage device 18, as is shown in FIG. 1. Storage device 18 includes a storage medium 22, such as, for example, a CD or DVD. Storage medium 22 is typically removable from storage device 18. When properly inserted into storage device 18, storage medium 22 will be supported within storage device 18 and rotatably moved by a servo assembly 24. Servo assembly 24 typically includes a spindle motor and mounting arrangement (neither of which are shown). Servo assembly 24 is connected to a drive controller 26. Drive controller 26 is typically a microprocessor that is configured to control the various subsystems in storage device 18 and communicate with host processor 12, through bus 16, in accord with one or more software programs.

Data is read from (or written to), storage medium 22 by a read/write assembly 28. For a read operation, read/write assembly 28 includes a laser diode and a laser pick-up circuit (neither of which are shown). Read/write assembly 28 is selectively positioned over storage medium 22 by servo assembly 24 during a read (or write) operation, under the control of controller 26. Data is usually stored on storage medium 22 along a continuous spiral track having a constant pit (e.g., data bit) size. Therefore, the information content is greater per revolution on the outside than on the inside of the storage medium.

Read/write assembly 28 is movable relative to storage medium 22 so that it can be positioned over a particular track and follow the track as the storage medium is rotated to read the desired data.

An analog signal is output by the read/write assembly 28 and provided to a data engine 30, such as, for example a digital signal processor (DSP). Data engine 30 converts the analog signal to a digital data stream, for example, using conventional analog-to-digital conversion techniques. Depending upon the type of storage device, data engine 30 can also be configured to descramble, correct, extract, exclude, and/or otherwise modify certain data in the data stream. For example, in certain CD-ROM drives, data engine 30 employs conventional demodulation techniques (e.g., data slicing) and cross interleaved Reed Solomon code (CIRC) correction techniques to extract main data (MD) and subcode data from the analog signal. The data on a conventional CD-ROM is separated into frames of data having about 2352 bytes of MD and 96 bytes of subcode data each. The subcode data format actually includes 98 bytes, however, two of the bytes or slots are left blank to detect the start of the subcode frame. The remaining 96 slots contain one byte of subcode data each. As shown, data engine 30 is also connected to and responsive to device controller 26.

The resulting digital data from data engine 30 is provided to a block decoder 32. Block decoder 32 is configured to facilitate the transfer of the digital data to the host processor 12, via a bus interface 35 and bus 16. During a read operation, block decoder 32 gathers and stores the frames of data in a drive memory 34. Block decoder 32 then transfers a group of frames (e.g., about 4–8 frames) from drive memory 34 to host processor 12 in a single burst transfer, via bus interface 35 and bus 16. Block decoder 32 is described in more detail below. Block decoder 32 is connected to and responsive to device controller 26.

Drive memory 34 is typically a conventional DRAM chip that is connected to, but otherwise separate from, block decoder 32. The size and operational parameters of drive memory 34 vary, depending upon the operating speed of storage device 18, the operation and latency of block decoder 32, and the operation and latency of host processor 12. It is common for a CD-ROM to have the capability to store at least about 50 frames of data in drive memory 34, when the block decoder transfers groups of frames in a burst. By way of example, drive memory 34 usually needs to be about 128-kilobytes for a 16X CD-ROM, and about 256-kilobytes for a 32X CD-ROM.

Storage device 18 further includes a bus interface 35 that provides the connectivity to bus 16. Bus interface 35 is a conventional interface circuit that is specifically designed for the particular format of bus 16. Thus, for example, in certain configurations bus interface 35 can be a SCSI, ATAPI, 1394, or other like bus interface. Bus interface 35 is further connected to, and responsive to, drive controller 26.

Figure 3:
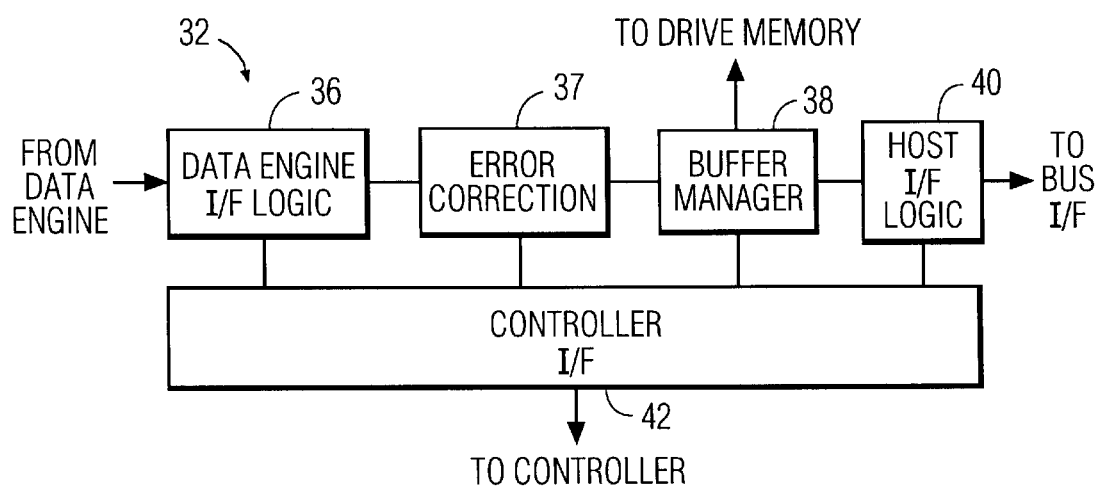
FIG. 3 is a block diagram depicting a block decoder, as in FIG. 2, that is arranged to facilitate the transfer of selected portions of the block of data from the storage device to the host processor; the exemplary block decoder having a data engine interface, error corrector, buffer manager, host interface, and controller interface.

FIG. 3 is a block diagram depicting an exemplary block decoder 32, as in FIG. 2. Block decoder 32 includes data engine interface logic 36, error correction logic 37, a buffer manager 38, host interface logic 40, and controller interface logic 42. Data engine interface logic 36 is configured to exchange data with data engine 30, and is responsive to commands from error correction logic 37, and drive controller 26, via controller interface logic 42. Host interface logic 40 is configured to exchange data with bus interface 35, and is responsive to commands from buffer manager 38, and drive controller 26 via controller interface logic 42. Similarly, controller interface logic 42 is configured to facilitate the exchange of control information between drive controller 26 and error correction logic 37, buffer manager 38, data engine interface logic 36 and host interface logic 40.

As the name implies, error correction logic 37 is provided to correct errors in the digital data received from data engine 30, via data engine interface logic 36. This typically includes employing conventional data correction techniques to evaluate certain data within each frame, identify particular types of errors, and, when applicable, correct the detected errors, for example, by automatically changing corrupted or otherwise incorrect data within the frame or requesting further assistance from controller 26, through controller interface 42.

In support of a read operation, buffer manager 38 receives frames of data from error correction logic 37 and selectively stores the frames of data in drive memory 34. Buffer manager 38 is further arranged to supply certain frames to host interface logic 40 for transfer to host processor 12. As described in detail below, when necessary, buffer manager 38, which is operatively coupled to controller 26 via controller interface 42, interrupts or otherwise requests further assistance from controller 26.

Figure 4:
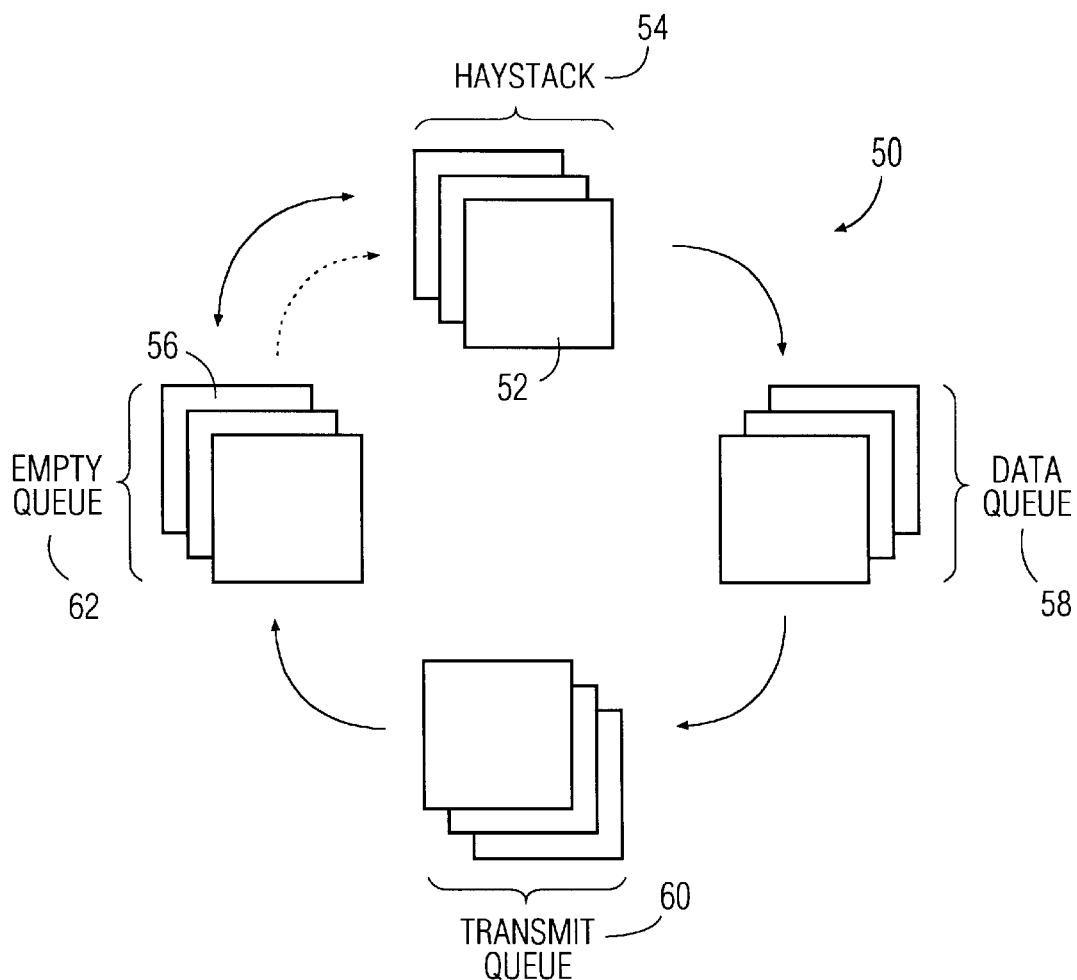
FIG. 4 is a graphical depiction of a conventional buffer management process for use in a block decoder, for example, as in FIG. 2, to facilitate the transfer of selected frames of the block of data from the storage device to the host processor; wherein the exemplary block decoder is capable of logically, physically, or otherwise managing a plurality of queues or stacks of received and stored data frames, of which at least a portion are subsequently transferred to the host processor.

FIG. 4 is a graphical depiction of a conventional buffer management process 50 that is embodied or otherwise employed in one or more of the functions/circuits of block decoder 32, for example, as shown in FIG. 3. Buffer management process 50 facilitates the transfer of selected frames of data to the host processor 12.

Buffer management process 50 is capable of logically, physically, or otherwise managing a plurality of queues (e.g., 54, 58, 60, and 62) of stored frames of data, such as, stored frame 52, which can be stored in drive memory 34. For example, one of these queues, namely transmit queue 60, includes frames of data that will eventually be transferred to host processor 12. Arrows are shown in FIG. 4 to graphically illustrate that buffer management process 50 logically, physically, or otherwise organizes or "places" frames in certain queues.

When a new frame of data arrives, buffer management process 50 places the new data in a new frame 58 from empty queue 62 to haystack queue 54. After a predetermined threshold number of frames have been placed in haystack queue 54, buffer management process 50 causes controller 26 to be interrupted. When this occurs, controller 26 evaluates each frame 52 in haystack queue 54 and determines what to do next. If controller 26 determines that frame 52 can be transferred to host processor 12, then buffer management process 50 places frame 52 into data queue 58, until such time as frame 52 is requested by host processor 12. When a frame or frames within data queue 58 are requested by host processor 12, buffer management process 50 places the requested frame(s) in transmit queue 60. Once in transmit queue 60, the frames are then transferred to host processor 12, for example, by host interface logic 40. Following the transfer of a frame 52 out of transmit queue 60, buffer management process 50 places frame 52 in an empty queue 62, which essentially frees up the associated memory resources for use in storing a subsequently arriving new frame 56.

If the evaluation by controller 26 for a given frame 52 determines that the frame 52 is not to be transferred to host processor 12, then the frame 52 is placed in empty queue 62. In this manner, buffer management process 50 is able to sort through the frames of data to determine whether it is proper to forward a particular frame to host processor 12.

In conventional CD-ROM drives, there are several frames of data that are not intended to be transferred to host processor 12, even if somehow requested. These include, but are not limited to, frames that are read from a lead-in area or a lead-out area of the CD-ROM.

Figure 5:
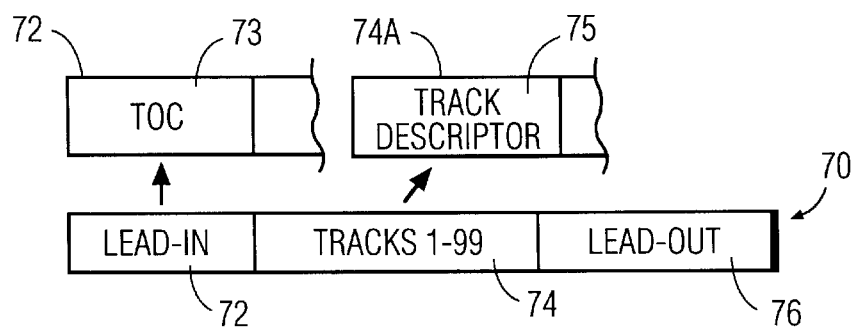
FIG. 5 is a graphical depiction of exemplary formatted data as recorded on a storage medium, as in FIG. 2, such as, for example, an optical storage disc; the formatted data includes a lead-in area having a table of contents (TOC) section, at least one track having a plurality of frames of data (i.e., smaller portions of data) therein, and a lead-out area.

FIG. 5 graphically depicts data 70 that is recorded on a CD-ROM. As shown, data 70 essentially includes a lead-in area 72, followed by between one and ninety-nine tracks 74, and then a lead-out area 76. Within lead-in area 72 there is a table of contents (TOC) section 73, which includes information pertaining to various parameters associated with tracks 74, such as, for example, the start and stop boundaries for each track. Similarly, within each track, for example, track 74a, there is a specific track descriptor 75 that contains additional information about track 74a. Track descriptor 75 is typically contained within the first 150 frames in the track. Lead-out area 76 is recorded at the end of data 70 and typically includes information that can be used by controller 26, for example, to recover and reposition read/write assembly 28 using servo assembly 24 if the scanning of the CD-ROM during a read operation erroneously passes beyond tracks 74.

With certain notable exceptions, the frames recorded in lead-in area 72, track descriptor 75, and lead-out area 76 are not typically transferred to host processor 12. Indeed, such a request and/or transfer is usually considered an error condition.

The track descriptor block is used by controller 26 to discover information about the track. For example, controller 26 can use the track descriptor block to determine if the track is a packet-written track, and if so, whether the packets within the track are of a fixed-length or of a variable-length, and if of a fixed-length, what the fixed-length is. As is known in the art, in packet-written tracks, data is recorded to the optical disc in a plurality of packets that are either of a fixed-length or of a variable-length to form one track.

Figure 6:
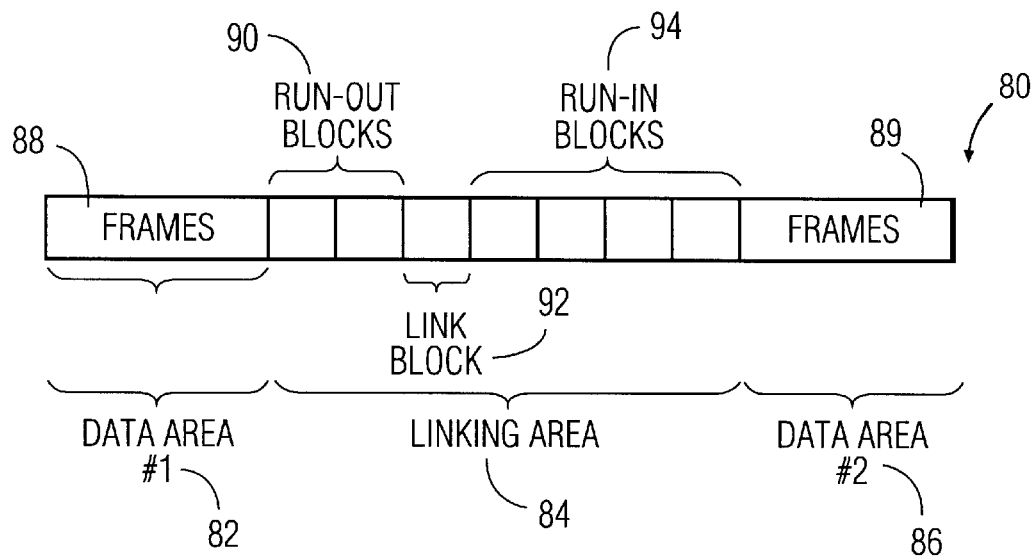
FIG. 6 is a graphical depiction of a portion of a track, as in FIG. 5, that is written in multiple discrete packets that are either of a fixed-length or a variable-length and separated by a plurality of linking blocks.

A portion of an exemplary packet-written track 80 is graphically depicted in FIG. 6 to illustrate how two packets are linked together within track 80. As shown, packet-written track 80 has a first data area 82 containing a plurality of frames 88 associated with a first packet, and a second data area 86 containing a plurality of frames 89 associated with a second packet. A linking area 84 is located between first data area 82 and second data area 86. Linking area 84 includes a plurality of run-out blocks 90, which are recorded during an initial write operation immediately following frames 88. During a subsequent write operation, several run-in blocks 94 are recorded prior to recording frames 89. Run-out blocks 90 and run-in blocks 94 essentially identify that a transition from one packet to the next packet is taking place, thereby providing the necessary information for storage device 18 to synchronize with the subsequently written packet data.

Between run-out blocks 90 and run-in block 94, there is a link block 92, which can include data recorded during both the initial write operation and the subsequent write operation. Thus, for example, link block 92 can include superimposed bits of data, some from the initial write operation and some from the subsequent write operation.

For fixed-length packets, the frames within run-out blocks 90, link block 92, and run-in blocks 94 are not usually transferred to host processor 12. However, for variable-length packets, the frames within run-out blocks 90, link block 92, and run-in blocks 94 can be transferred to host processor 12. Thus, storage device 18 needs to have the additional capability to distinguish between fixed-length and variable-length packet-written tracks. As discussed below, the information needed to make decisions, such as these, is typically provided in the data recorded on storage medium 22 (e.g., in the track decriptor, TOC, etc.).

The complexity of buffer management process 50 is, therefore, increased to support reading packet-written tracks. This complexity can increase the latency associated with storage device 18. For example, the latency tends to increase when host processor 12 requests the transfer of a block of data that includes multiple frames, a portion of which are from linking area 84. If host processor 12 does not request the frames associated with linking area 84, then buffer management process 50 needs to move unwanted frames from transmit queue 60 to empty queue 62. This additional parsing of frames typically requires that controller 26 be interrupted, and results in multiple transfers, rather than a single transfer of the frames. Both of these side-effects tend to increase the latency of storage device 18.

Thus, there is a need for improved methods and arrangements that effectively reduce processing burden associated with the determining which frames are to be transfered to host processor 12.

As described below, improved methods and arrangements are provided, in accordance with certain embodiments of the present invention, for streamlining the various decisions that need to be made in storage device 18. In accordance with certain aspects of the present invention, an improved block decoder includes additional functionality, for example, embodied in digital logic, that identifies certain attributes about each new frame 56 and marks or otherwise identifies each new frame 56 in a manner that later reduces the need to interrupt controller 26 and/or break up a transfer of frames into multiple transfers. Thus, the decision to move a frame 52 from haystack queue 54 to data queue 58 can be simplified, and/or the decision to transfer a frame associated with a link area 84 from transmit queue 60 to empty queue 62 can be simplified.

Figure 7:
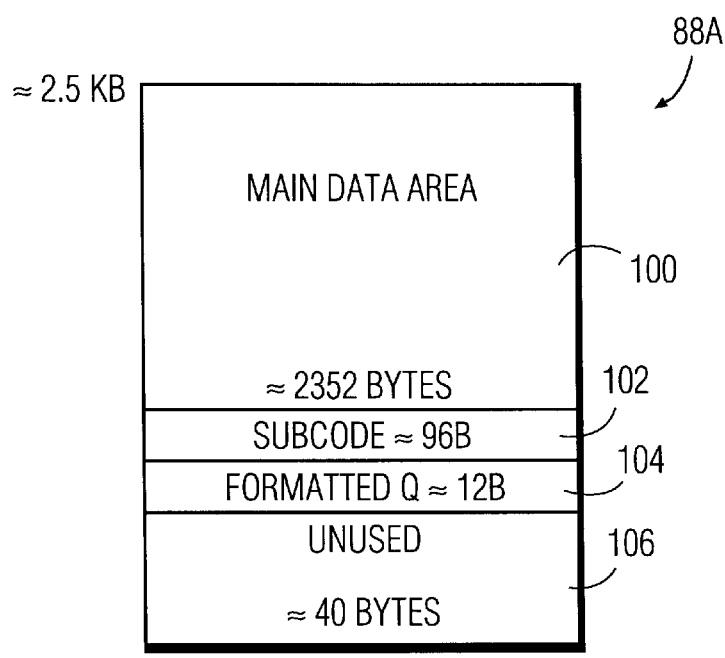
FIG. 7 is a graphical depiction of different areas, such as a main data area and a spare (unused) area, included in an exemplary frame of data, as in FIG. 5, that is stored in a drive memory.

With this in mind, in addition to the TOC 73 and track descriptor 75 (described above), additional information about the data recorded on storage medium 22 is available within each valid frame, regardless of the type of frame. FIG. 7 is a graphical depiction of an exemplary conventional frame 88a that is about 2.5 kilobytes long. As shown, frame 88a includes a main data area 100 where user data is recorded, a subcode area 102 and a formatted-Q area 104, and a spare (unused) area 106.

Figure 8:
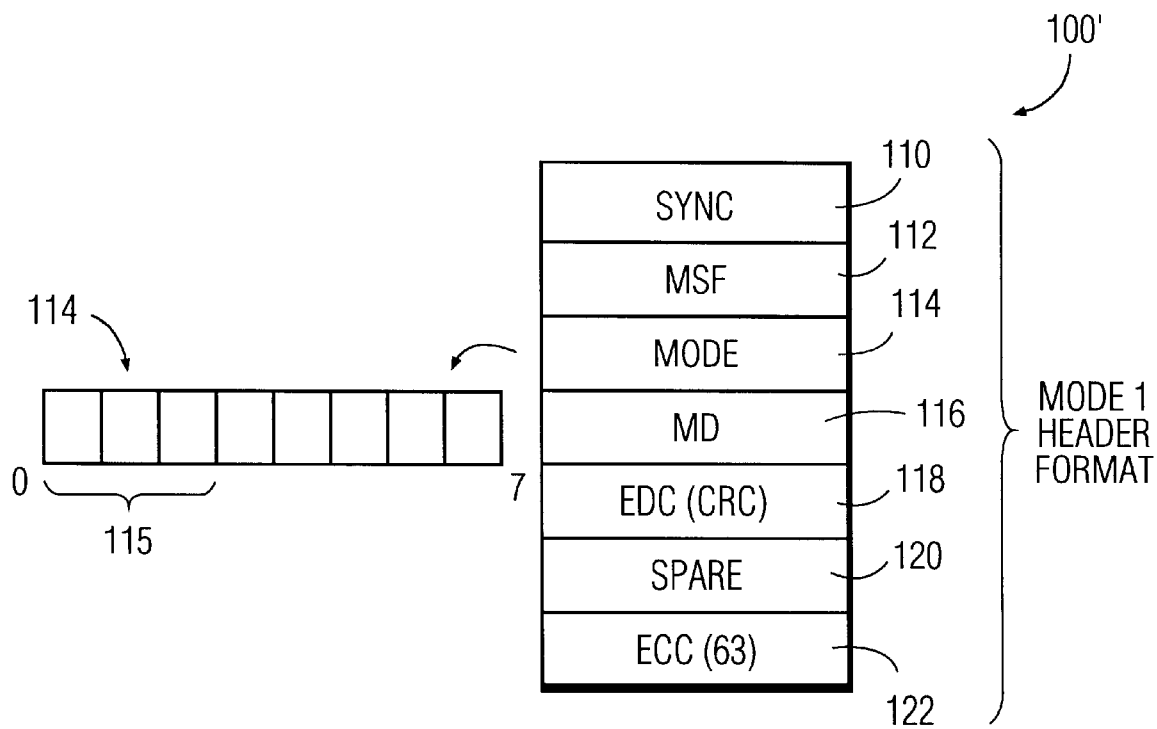
FIG. 8 is a graphical depiction of different data fields found in an exemplary formatted main data area, as in FIG. 7.

FIG. 8 is a graphical depiction of the various data fields found in the data from data engine 30. Block decoder 32 uses a synchronization data field (SYNC) 110, a minute-second-frame (MSF) address 112, and a mode byte (MODE) 114 to align the frames of data, find the address information and mode of the track. This information is transferred to main data area 100'. An error detection code (e.g., CRC) 118 and an error correction code (ECC) 122 (e.g., containing a C3 code) are used by error corrector 37 to check the integrity of the main data (MD) 116 (i.e., user data). As depicted in FIG. 7, there is also an additional data stream containing subcode data, which is stored in areas 102 and 104. By way of example, for a conventional Mode 1 formatted header, these fields include a 12-byte SYNC 110, MSF address 112, MODE 114, MD 116, an error detection code (EDC) 118, a spare field (SPARE) 120, and an error correction code (C3) 122.

Figure 11:
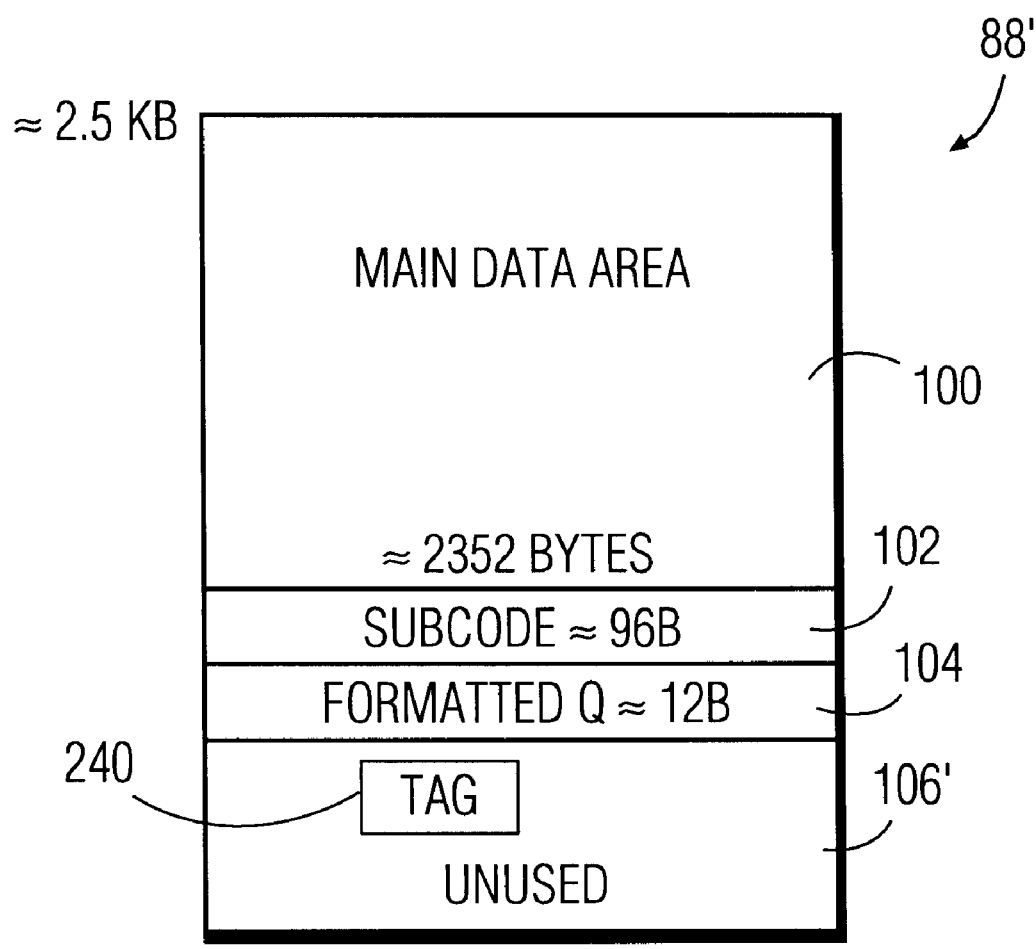
FIG. 11 is a graphical depiction of a tagged frame of data having an opcode tag, in accordance with certain embodiments of the present invention.

Using portions of the information described above, the method and arrangements in accordance with certain embodiments of the present invention, advantageously decrease the latency associated with storage device 18, and in particular, the latency introduced by buffer management process 50 when transferring frames from transmit queue 60 to host processor 12. These methods and arrangements, which can be embodied in hardware and/or software, basically employ an operational code (opcode) tag 240 (e.g., see FIG. 11), which can be applied early in the process to each new frame 56.

The opcode tag 240 is used within storage device 18 to speed up subsequent processing of the frame, for example, during transfer to host processor 12. In accordance with certain preferred embodiments of the present invention, opcode tag 240, for example, as graphically depicted in frame 88' in FIG. 11, takes the form of binary data that is added or otherwise included in spare area 106'. This binary data identifies a particular operation that needs to occur within buffer management process 50.

Figure 9:
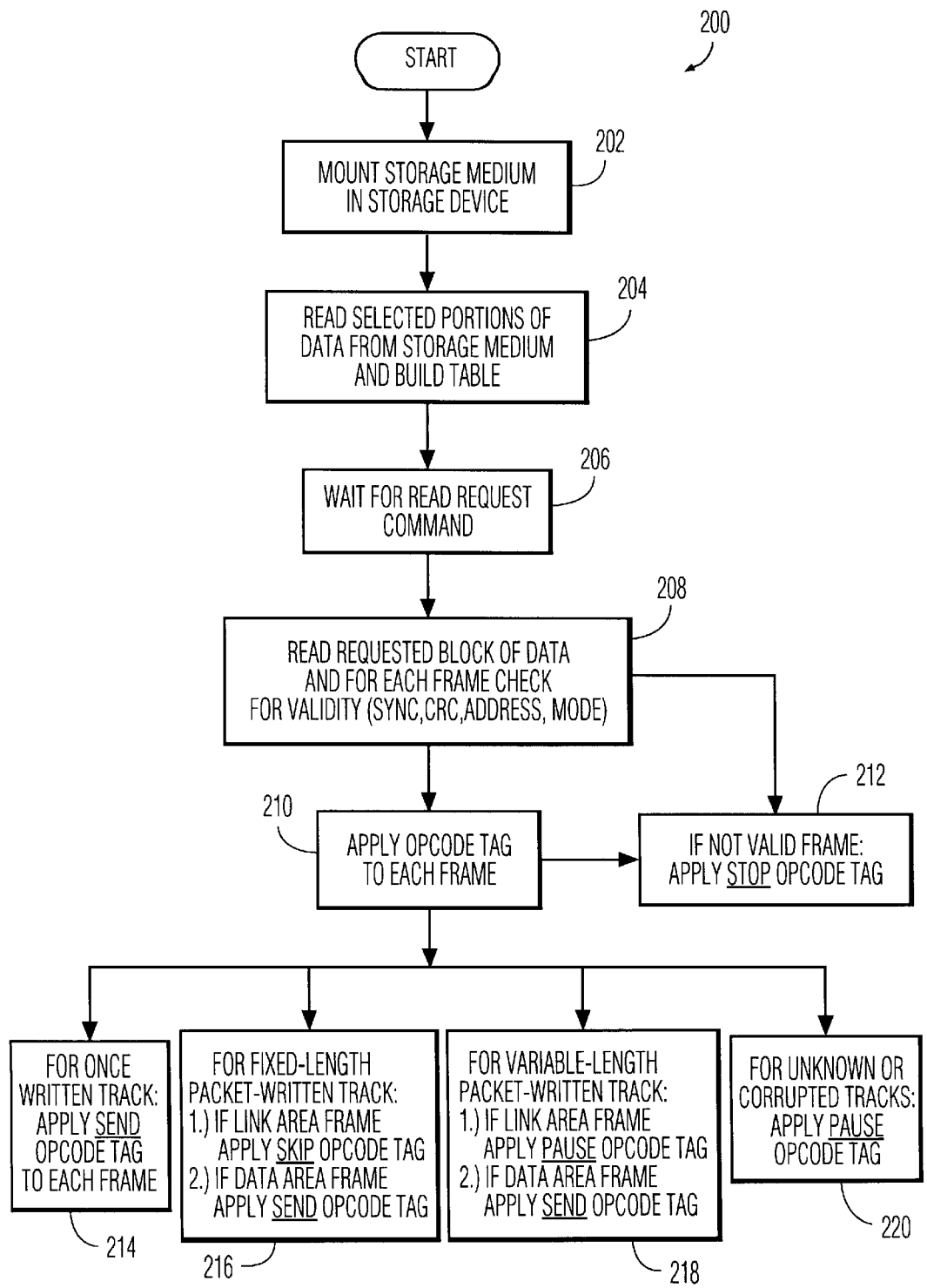
FIGS. 9 and 10 are flow diagrams depicting processes for use in a modified storage device, the processes being configured to apply an opcode tag to a frame of data based on certain criteria and to further process the frame of data based on the opcode tag, in accordance with certain embodiments of the present invention.

FIG. 9 depicts a flow diagram of a process 200 for use in a storage device 18' (i.e., a modified version of storage device 18 in FIGS. 2 and 3). Process 200 includes an initial step 202 of mounting storage medium 22 in storage 18'. For example, step 202 can include inserting an optical storage disc into a CD drive, DVD Drive, or the like. Next, in step 204, selected portions of the data 70 recorded on storage medium 22 are read and certain information is gathered. For example, the TOC 73 is read to gather information about the number of tracks 74 recorded in data 70 and the relative starting and stopping locations for each track 74. Further, the track descriptor 75 in each track can be read to gather additional information regarding whether the track is a once-written track or either a fixed-length or a variable-length packet-written track. This information, which provides characteristics about the tracks, is then included in a table that is stored, or otherwise maintained, within storage device 18.

Next, in step 206, storage device 18 waits to receive a read request command from the host processor 12. In response to a read request command, process 200 proceeds to step 208, where the requested block of data, or a subset thereof, is read from storage device 22. At this step, the hardware can be set up for tag definition. As each new frame 56 is read, several validation checks are conducted. For example, a synchronization test is conducted to determine if the read was valid. If the frame passes the synchronization test, then a conventional CRC is conducted. Further, the address of the frame can also be verified as being within an acceptable range of addresses, for example, as determined by the read operation. If the frame fails the address validity processes/tests, then a STOP opcode tag is applied to the frame in steps 210 and 212. The STOP opcode tag essentially identifies that there is a problem with the frame. A STOP opcode is used, for example, for known illegal frames, such as, one having illegal addresses. Compare this to a PAUSE opcode tag, which is used for corrupted data or unknown data, for example. Unlike a STOP opcode tag, for a PAUSE opcode tag, controller 26 is interrupted immediately and may perform a retry operation before being requested by host processor 12.

Assuming that a frame is found to be valid in step 208, then in step 210, either a SEND, SKIP, or PAUSE opcode tag is applied to the frame, depending on the type of track and frame.

For a written-once track (e.g., a CD-ROM, or DVD-ROM) a SEND opcode tag will be applied, in step 214, because the frame can be transferred to host processor 12. The frame is determined to be part of either a written-once track or a packet-written track based on information in the table created in step 204.

For a fixed-length packet-written track, in step 216, there are two opcode tags that can be applied, depending upon the type of frame (i.e., linking area frame or data area frame). The type of frame can be determined using the mode field 114 in the header of the frame, for example, as graphically depicted in FIG. 8. Thus, for example, the first three (3) bits 115 in the byte of data in mode field 114 identify whether the frame is a link area frame or a data area frame. If the frame is a link area frame of a fixed-length packet-written track, then host processor 12 is not to receive the frame. Thus, a SKIP opcode tag is applied to the link area frame and the frame is not transferred to host processor 12. If the frame is a data area frame, then host processor 12 is allowed to receive the frame. Thus, a SEND opcode tag is applied to the data area frame and it is transferred to host processor 12.

For a variable-length packet-written track, in step 218, there are also two opcode tags that can be applied, depending upon the type of frame (i.e., linking area frame or data area frame). Again, the type of frame can be determined using the mode field 114 in the header of the frame, for example, as graphically depicted in FIG. 8. If the frame is a link area frame, then host processor 12 is allowed to receive the frame. However, there may be a need to perform some additional processing of the frame before it can be transferred to host processor 12. Referring back to FIG. 6, it can be seen that there are seven blocks of data within linking area 84. It is not uncommon, however, for data engine 30 to output eight blocks of data rather than seven blocks of data due to the superposition of data in link block 92. Consequently, this extra block of data, which is typically referred to as a "slip" block, needs to be identified and not transferred to host processor 12. Thus, a PAUSE opcode tag is applied to the link area frame and the frame is not to be transferred to host processor 12, but instead is held for further processing, for example, by controller 26. Controller 26 may then update/correct the link blocks and overwrite the opcode tag data with SEND; and may write SKIP tag data to any extra frames. If the frame is a data area frame, then host processor 12 is allowed to receive the frame. Thus, a SEND opcode tag is applied to the data area frame and the frame is transferred to host processor 12.

If a valid frame cannot be determined to fit one of the above types, then in step 220, a PAUSE opcode tag is applied to allow further processing to be conducted, for example, by controller 26. A PAUSE opcode tag can also be used when there is a detected error correction failure, sync slip, etc. In this manner, the methods and arrangements are intended to support future generations of storage devices, or other unknown/obscure storage medium formats. However, it is recognized that the additional processing required in response to a PAUSE opcode may result in an increase in the latency of the storage device, rather than a decrease.

In accordance with certain preferred embodiments of the present invention, process 200 is embodied in digital logic within a block decoder, as in FIGS. 2 and/or 3. For example, the synchronization, CRC, and address range, and mode testing and opcode tag generation/application can be conducted within modified versions of data engine interface logic 36 and/or error correction logic 37. Such tests are well known to those skilled in the art, and are found in conventional storage devices. Further, those skilled in the art will recognize that digital logic and/or software/firmware logic can be employed in one or more of the subsystems in a modified version of storage device 18 in practicing the methods and arrangements of the present invention. Thus, for example, the firmware program running on controller 26 can be modified to further support the various steps in process 200.

Figure 10:
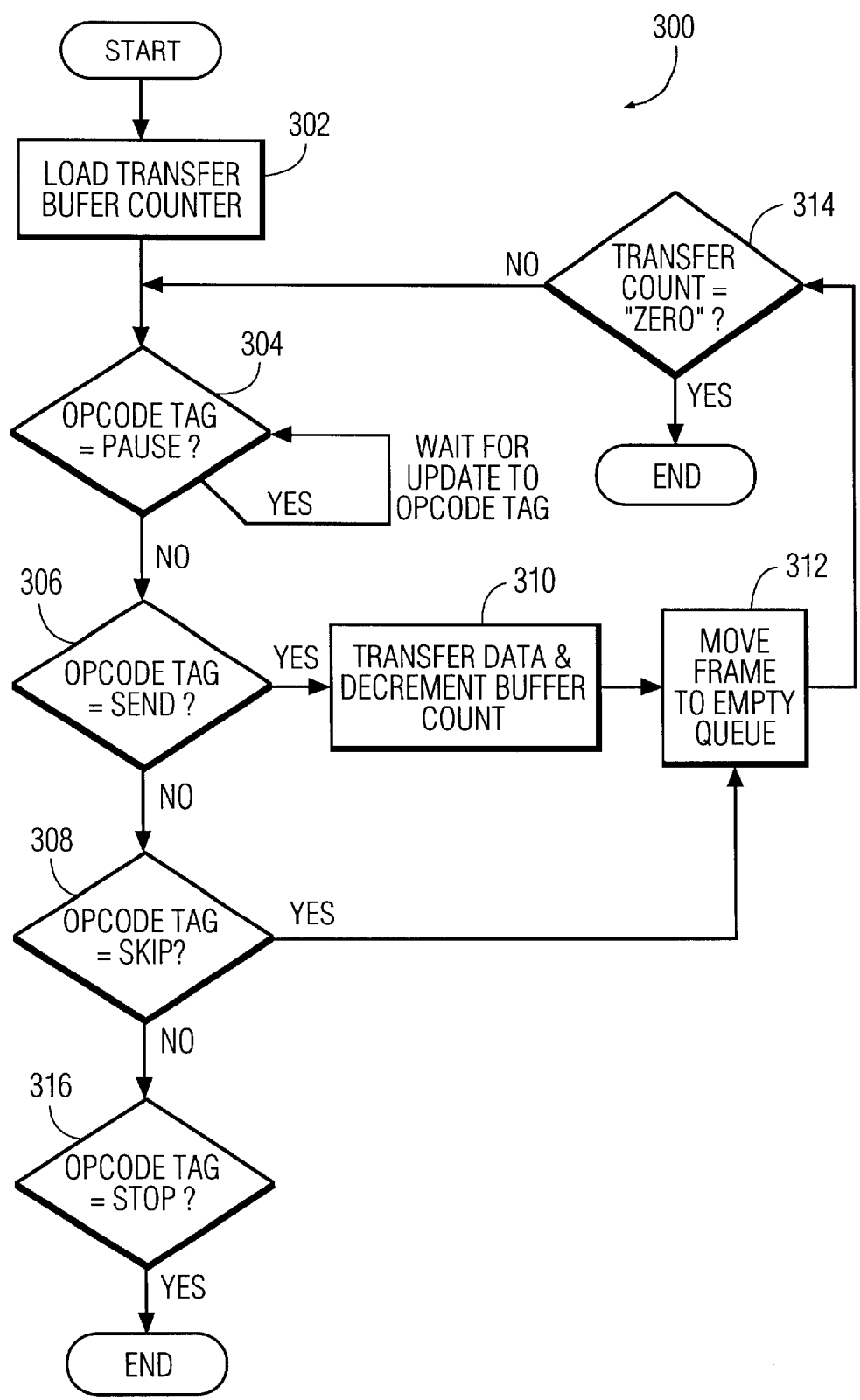

FIG. 10 is a flow diagram depicting an additional process 300 for use in a storage device 18'. Process 300 includes a step 302, wherein a transfer buffer counter is loaded to support the transfer of data to host processor 12. The transfer buffer counter can include, for example, the number of frames 88' already having an associated opcode tag 240, that are in transmit queue 60.

If opcode tag 240 equals PAUSE, as determined in step 304, then process 300 waits for controller 26 to change the opcode tag to either SEND or SKIP. For example, if frame 88' is marked as a PAUSE because it was a link area fame from a variable-length packet-written track, then, provided the frame is not later determined to be a slip frame, the opcode tag 240 will be changed to SEND. Conversely, if frame 88' is later determined to be a slip frame, then opcode tag 240 will be changed to SKIP. If opcode tag 240 equals SKIP, then in step 312, the frame will be placed in empty queue 62 in accord with step 306.

If the opcode tag is SEND, as determined in step 306, the frame of data is transferred to host processor 12 and the buffer count is decremented, in accord with step 310. Next, the frame or slot is moved to empty queue 62 in step 312.

In step 314, it is determined if the transfer count is equal to 0. If the transfer count is equal to 0, then process 300 ends. If the transfer count does not equal 0, then there are additional frames of data to be processed and process 300 returns to step 304.

Referring back to step 306, if the opcode tag is not SEND, then process 300 proceeds to step 308. In step 308, it is determined if the opcode tag is SKIP. If the opcode tag is SKIP, then process 300 proceeds to step 312 and subsequently 314, as decribed above.

If the opcode tag is not SKIP, but is STOP as determined in step 316, then process 300 ends.

It is recognized that, if needed for a particular configuration, opcode tag 240 can be removed from frame 88' prior to transferring frame 88' to host processor 12. However, in most configurations this is not necessary since the additional information in opcode tag 240 should not adversely affect host processor 12.

In accordance with certain preferred embodiments of the present invention, process 300 is embodied in digital logic. For example, steps 302, 306 and 312 can be conducted within modified versions of block decoder 32 and/or controller 26, and steps 304, 308 and 310 can be conducted in modified versions of host interface logic 40 and/or controller 26. Those skilled in the art will further recognize that digital logic and/or software/firmware logic can be employed in one or more of the subsystems in a modified version of storage device 18, to practice the methods and arrangements of the present invention. Thus, for example, the firmware program running on controller 26 can be modified to further support the various steps in process 300.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A decoder for use in transferring data from a data storage medium to external device, the data storage medium having at least one data track comprising a plurality of frames of data recorded thereon, the decoder comprising:

an input arrangement configured to receive at least one frame of data, determine certain characteristics about the frame of data, apply a tag data to the frame of data based on at least one characteristic about the frame of data, and output a tagged frame of data;

a frame managing arrangement coupled to the input arrangement and configured to receive the tagged frame of data from the input arrangement, store the tagged frame of data, and subsequently output the tagged frame of data; and an output arrangement coupled to the frame managing arrangement and configured to receive the tagged frame of data from the frame managing arrangement and provide the tagged frame of data to an external device as a function of the tag data within the tagged frame of data.

2. The decoder as recited in claim 1, wherein the tag data is selected from at least one of a group of tags comprising a send tag, a skip tag, a pause tag, and a stop tag.

3. The decoder as recited in claim 2, wherein the input arrangement is further configured to apply a send tag to the frame of data when the at least one characteristic identifies that the frame of data is selected from at least one of a group of frames of data comprising a main area frame from a once-written track, a main area frame from a fixed-length packet-written track, a main area frame from a variable-length packet-written track, and a valid link area frame from a variable-length packet-written track.

4. The decoder as recited in claim 2, wherein the input arrangement is further configured to apply a skip tag to the frame of data when the at least one characteristic identifies that the frame of data is a link area frame from a fixed-length packet-written track.

5. The decoder as recited in claim 2, wherein the input arrangement is further configured to apply a pause tag to the frame of data when the at least one characteristic identifies that the frame of data is a link area frame from a variable-length packet-written track.

6. The decoder as recited in claim 2, wherein the input arrangement is further configured to apply a stop tag to the frame of data when the at least one characteristic identifies that the frame of data is not a valid frame of data.

7. The decoder as recited in claim 2, wherein the input arrangement is further configured to apply a pause tag to the frame of data when the at least one characteristic identifies that the frame of data is not selected from at least one of a group of frames of data comprising a main area frame from a once-written track, a main area frame from a fixed-length packet-written track, a main area frame from a variable-length packet-written track, a link area frame from a fixed-length packet-written track, and a link area frame from a variable-length packet-written track.

8. The decoder as recited in claim 2, wherein the output arrangement is further configured to provide the tagged frame of data to an external device only if the tag data associated with the tagged frame is the send tag.

9. The decoder as recited in claim 1, wherein the frame of data comprises a plurality of fields including a first field having data therein, and the input arrangement is further configured to modify the data within the first field to create the tag data.

10. The decoder as recited in claim 1, wherein the input arrangement is further configured to apply a send tag to the frame of data when the at least one characteristic identifies that the frame of data is selected from at least one of a group of frames of data comprising a main area frame from a once-written track, a main area frame from a fixed-length packet-written track, a main area frame from a variable-length packet-written track, and a valid link area frame from a variable-length packet-written track.

11. The decoder as claimed in claim 1, wherein the input arrangement is further configured to apply a skip tag to the frame of data when the at least one characteristic identifies that the frame of data is a link area frame from a fixed length packet-written track, or to apply a pause tag to the frame of data when the at least one characteristic identifies that the frame of data is a link area frame from a variable-length packet-written track, or to apply a stop tag to the frame of data when the at least one characteristic identifies that the frame of data is not a valid frame of data.

12. The decoder as recited in claim 1, wherein the output arrangement is further configured to provide the tagged frame of data to an external device only if the tag data associated with the tagged frame is the send tag.

13. A storage device for use in a computer system, the storage device comprising:

a servo assembly;

a storage medium mounted on the servo assembly and having at least one track of data recorded thereon, wherein the track of data comprises a plurality of frames of data;

a read assembly operatively configured to read at least a portion of the track of data and output a read signal;

a data engine coupled to the read assembly and configured to receive the read signal and output at least one frame of data based on at least a portion of the read signal;

an input arrangement coupled to the data engine and configured to receive the frame of data, determine certain characteristics about the frame of data, apply a tag data to the frame of data based on at least one characteristic about the frame of data, and output a tagged frame of data;

a frame managing arrangement coupled to the input arrangement and configured to receive the tagged frame of data from the input arrangement, store the tagged frame of data, and subsequently output the tagged frame of data; and an output arrangement coupled to the frame managing arrangement and configured to receive the tagged frame of data from the frame managing arrangement and provide the tagged frame of data to an external device as a function of the tag data within the tagged frame of data.

14. A method for use in transferring data from a data storage medium to an external device, the method comprising:

reading at least one frame of data from a data storage medium having at least one data track comprising a plurality of frames of data;

determining certain characteristics about the frame of data;

applying a tag data to the frame of data based on at least one characteristic about the frame of data; and providing the tagged frame of data to an external device as a function of the tag data within the tagged frame of data.

15. The method as recited in claim 14, wherein the step of applying the tag data to the frame of data further comprises selecting the tag data from at least one of a group of tags comprising a send tag, a skip tag, a pause tag, and a stop tag.

16. The method as recited in claim 15, wherein the step of applying the tag data to the frame of data further comprises applying the send tag to the frame of data when the at least one characteristic identifies that the frame of data is selected from at least one of a group of frames of data comprising a main area frame from a once-written track, a main area frame from a fixed-length packet-written track, a main area frame from a variable-length packet-written track, and a valid link area frame from a variable-length packet-written track.

17. The method as recited in claim 15, wherein the step of applying the tag data to the frame of data further comprises applying a skip tag to the frame of data when the at least one characteristic identifies that the frame of data is a link area frame from a fixed-length packet-written track or a slip frame.

18. The method as recited in claim 15, wherein the step of applying the tag data to the frame of data further comprises applying a pause tag to the frame of data when the at least one characteristic identifies that the frame of data is a link area frame from a variable-length packet-written track.

19. The method as recited in claim 15, wherein the step of applying the tag data to the frame of data further comprises applying a stop tag to the frame of data when the at least one characteristic identifies that the frame of data is not a valid frame of data.

20. The method as recited in claim 15, wherein the step of applying the tag data to the frame of data further comprises applying a pause tag to the frame of data when the at least one characteristic identifies that the frame of data is not selected from at least one of a group of frames of data comprising a main area frame from a once-written track, a main area frame from a fixed-length packet-written track, a main area frame from a variable-length packet-written track, a link area frame from a fixed-length packet-written track, and a link area frame from a variable-length packet-written track.

21. The method as recited in claim 15, wherein the step of providing the tagged frame of data to an external device further comprises providing the tagged frame of data to the external device only if the tag data associated with the tagged frame is the send tag.

22. The method as recited in claim 14, wherein the step of applying the tag data to the frame of data further comprises modifying data within the frame of data to create the tag data.

23. The method as recited in claim 14, wherein the step of determining certain characteristics about the frame of data further comprises reading data from selected portions of the data storage medium to determine if the frame of data is selected from at least one of a group of frames of data comprising a main area frame from a once-written track, a main area frame from a fixed-length packet-written track, a main area frame from a variable-length packet-written track, a link area frame from a fixed-length packet-written track, and a link area frame from a variable-length packet-written track.

* * * * *